(12) United States Patent
Saygan et al.

(10) Patent No.: US 11,872,660 B2
(45) Date of Patent: Jan. 16, 2024

(54) FAST HEAT PIPE DESIGN AND ANALYSIS METHODOLOGY

(71) Applicants: ASELSAN ELEKTRONIK SANAYI VE TICARET ANONIM SIRKETI, Ankara (TR); IHSAN DOGRAMACI BILKENT UNIVERSITESI, Ankara (TR); ORTA DOGU TEKNIK UNIVERSITESI, Ankara (TR)

(72) Inventors: Samet Saygan, Ankara (TR); Yigit Akkus, Istanbul (TR); Barbaros Cetin, Ankara (TR); Zafer Dursunkaya, Ankara (TR)

(73) Assignees: ASELSAN ELEKTRONIK SANAYI VE TICARET ANONIM SIRKETI, Ankara (TR); IHSAN DOGRAMACI BILKENT UNIVERSITESI, Ankara (TR); ORTA DOGU TEKNIK UNIVERSITESI, Ankara (TR)

( * ) Notice: Subject to any disclaimer, the term of this patent is extended or adjusted under 35 U.S.C. 154(b) by 0 days.

(21) Appl. No.: 18/250,546

(22) PCT Filed: Oct. 19, 2021

(86) PCT No.: PCT/TR2021/051071
§ 371 (c)(1),
(2) Date: Apr. 26, 2023

(87) PCT Pub. No.: WO2022/093158
PCT Pub. Date: May 5, 2022

(65) Prior Publication Data
US 2023/0321772 A1 Oct. 12, 2023

(30) Foreign Application Priority Data
Oct. 26, 2020 (TR) .................................. 2020/17018

(51) Int. Cl.
*B23P 15/26* (2006.01)
(52) U.S. Cl.
CPC ........... *B23P 15/26* (2013.01); *B23P 2700/09* (2013.01)
(58) Field of Classification Search
CPC ...... B23P 15/26; B23P 2700/09; F28D 15/02; F28D 15/04; F28D 15/043
See application file for complete search history.

(56) References Cited

U.S. PATENT DOCUMENTS

| | | |
|---|---|---|
| 2007/0107870 A1 | 5/2007 | Liu et al. |
| 2019/0014688 A1* | 1/2019 | Weibel ..................... B23P 15/26 |
| 2023/0247793 A1* | 8/2023 | Hakamada .............. F28D 15/04 |
| | | 165/104.26 |

FOREIGN PATENT DOCUMENTS

JP 2008008573 A 1/2008

OTHER PUBLICATIONS

Bahman Zohuri, Heat Pipe Design and Technology: modern applications tor practical thermal management, Springer, 2016, pp. 1-513.

(Continued)

*Primary Examiner* — Gordon A Jones
(74) *Attorney, Agent, or Firm* — Bayramoglu Law Offices LLC (57) ABSTRACT

A method for performance determination of a heat pipe with an arbitrary liquid flow area and prescribed geometric dimensions, an external and internal structure, a heat pipe material and a working fluid, heating and cooling surface areas, and condenser cooling conditions is provided to obtain operating and performance parameters, wherein the operating and performance parameters are temperature distribution within the heat pipe, a heat transferred via a phase change and a conduction, an axial variation of a radius of curvature of a liquid-vapor interface along the heat pipe, a (Continued)

vapor temperature and pressure of the working fluid, by simulating a flow and an energy transfer inside.

4 Claims, 4 Drawing Sheets

(56) References Cited

OTHER PUBLICATIONS

D.A. Reay, et al., Heat Pipes: Theory, Design and Applications, 2013, pp. 1-251.
Amir Faghri, Heat Pipes: Review, Opportunities and Challenges, Frontiers in Heat Pipes, 2014, pp. 1-48, vol. 5 No. 1.
Hossein Alijani, et al., 3-D modeling of a flat grooved heat pipe, ICCHM2T2017, 2017, pp. 1-9.
D. Khrustalev, et al., Thermal Characteristics of Conventional and Flat Miniature Axially Grooved Heat Pipes, Transactions of the ASME—Journal of Heat Transfer, 1995, pp. 1048-1054, vol. 117.
R. Hopkins, et al., Flat Miniature Heat Pipes With Micro Capillary Grooves, Transactions of the ASME—Journal of Heat Transfer, 1999, pp. 102-109, vol. 121.
Sung Jin Kim, et al., Analytical and experimental investigation on the operational characteristics and the thermal optimization of a miniature heat pipe with a grooved wick structure, International Journal of Heat and Mass Transfer, 2003, pp. 2051-2063, vol. 46 No. 11.
Kyu Hyung Do, et al., A mathematical model tor analyzing the thermal characteristics of a flat micro heat pipe with a grooved wick, International Journal of Heat and Mass Transfer, 2008, pp. 4637-4650, vol. 51.
Frederic Lefevre, et al., Prediction of the temperature field in flat plate heat pipes with micro-grooves: Experimental validation, International Journal of Heat and Mass Transfer, 2008, pp. 4083-4094, vol. 51.
Bin Xiao, et al., A three-dimensional thermal-fluid analysis of flat heat pipes, International Journal of Heat and Mass Transfer, 2008, pp. 3113-3126, vol. 51.
J.-M. Tournier, et al., A heat pipe transient analysis model, International Journal of Heat and Mass Transfer, 1994, pp. 753-762, vol. 37 No. 5.
Gulnihal Odabasi, Modeling of Multidimensional Heat Transfer in a Rectangular Grooved Heat Pipe, 2014, pp. 1-156.
Cem Kurt, Three-Dimensional Modeling of Heat Transfer and Fluid Flow in a Flat-Grooved Heat Pipe, 2019, pp. 1-91.
K. Vafai, et al., Analysis of flow and heat transfer characteristics of an asymmetrical flat plate heat pipe, Int. J. Heat Mass Transfer, 1992, pp. 2087-2099, vol. 35 No. 9.
Manoj Sujanani, et al., Microcomputer-Enhanced Optical Investigation of Transport Processes with Phase Change in Near-Equilibrium Thin Liquid Films, Journal of Colloid and Interjace Science, 1991, pp. 472-488, vol. 143 No. 2.
Frederic Lefevre, et al., Confocal Microscopy for Capillary Film Measurements in a Flat Plate Heat Pipe, Journal of Heat Transfer—Transactions of the ASME, 2010, pp. 031502 (1-6), vol. 132.

\* cited by examiner

FAST HEAT PIPE DESIGN AND ANALYSIS METHODOLOGY

CROSS REFERENCE TO THE RELATED APPLICATIONS

This application is the national stage entry of International Application No. PCT/TR2021/051071, filed on Oct. 19, 2021, which is based upon and claims priority to Turkish Patent Application No. 2020/17018, filed on Oct. 26, 2020, the entire contents of which are incorporated herein by reference.

TECHNICAL FIELD

The invention relates to a method for performance determination of a heat pipe with arbitrary liquid flow area and prescribed geometric dimensions, external and internal structure, heat pipe material and working fluid, heating and cooling surface areas, condenser cooling conditions to obtain operating and performance parameters (temperature distribution within the heat pipe, the heat transferred via phase change and conduction, the axial variation of the radius of curvature of the liquid-vapor interface along the heat pipe, the vapor temperature and pressure of the working fluid) by simulating the flow and energy transfer inside.

BACKGROUND

The development of micro-manufacturing technologies enabled the integration of over a billion transistors on chips used in electronic devices. Currently, there is a reduction in the size of the electronic components manufactured with this technology, despite increased performance [1, 2]. These developments have increased the heat flux dissipated by the electronic components and made the thermal management of the components difficult. Traditional cooling methods such as air cooling have reached their limits leading to certain problems such as high temperatures, uneven surface temperature distributions, and dynamic temperature profiles on electronic components; wherein, the need for modern cooling methods that can replace these classical methods has emerged. Heat pipes, which do not need any external actuator systems such as pumps, operate in a passive and closed loop and have high heat transfer capacity owing to the phase change of the working fluid, are preferred increasingly in the cooling of electronic components in many fields such as defense, aviation, and space industries.

Owing to their ability to transfer high heat loads with small temperature difference, heat pipes have been used as passive heat spreaders for many years in the thermal management of devices dissipating high heat flux. While the thermal conductivity of common engineering metals is between 100-500 W/m·K, the effective thermal conductivity of various heat pipes using phase change heat transfer can be several orders of magnitude higher [1-2]. Therefore, heat pipes are widely applied in the homogenization of localized high temperature zones in electronics cooling. Having no alternative in this regard, heat pipes have been used, especially in thermal management in space applications due to their highly reliable operation without requiring any external actuators in non-gravity or even anti-gravity applications. Therefore, the prior art includes numerous studies on various aspects of heat pipes [1-5].

One of the key points in heat pipe research is the simulation of the operation of the heat pipe. In this regard, it is necessary to accurately model the phase change together with momentum and energy transfer inside the heat pipe. Many complex concurrent physical phenomena occur inside the heat pipe. Modeling this problem is challenging due to the presence of different physical phenomena such as evaporation, condensation, capillary fluid flow, and counter vapor flow. Therefore, specifically 1D simplified models were proposed in the literature [1-4].

In the prior art, 2D and 3D comprehensive models were presented in research articles [6-12] presenting important innovations regarding the modeling of heat pipes. The utilization of these comprehensive models requires;
knowledge on numerical methods,
having necessary engineering analysis software,
high computing power, and
long computation time.

The prior art also includes studies performing 3D modeling without using a thermal resistance network. In these studies, the solution methods based on the discretization of mass, momentum and energy equations were employed for both porous [13] and grooved [14-16] heat pipes. Nevertheless, these methods employ iterative solutions of partial differential equations, which require computation time orders of magnitude higher than that of the methodology proposed in this patent application. Simulation of the concurrent physical phenomena taking place inside the heat pipe is a challenging task. One-dimensional simplified models used in the prior art to address this issue may not yield sufficiently accurate results in different operating conditions. For example, when subjected to high heat loads, heat pipes continue to operate with some performance loss in the presence of partial dryout (in the evaporator section) and/or partial pool formation (in the condenser section). One-dimensional simplified models are not capable of making any performance estimations for these situations. As another example, 1D simplified models lead to significant errors in the aforementioned cases because of the omission of the fluid flow in the evaporator and condenser sections and these errors amplify with increasing ratio of the lengths of the heating and cooling sections to the total length of the heat pipe.

Patent application numbered JP2008008573A was found in the literature search on the prior art. This application relates to the heat pipe design method based on prescribed design parameters and operating conditions. In the aforementioned method, the dryout in the evaporator section and the formation of the pool in the condenser section could not be detected and the heat transferred by the phase change ($Q_{pc}$) was not described as a convergence criterion.

A study found during the literature search conducted by Lefèvre et al. [11] in 2008, reported a method showing some similarities with the proposed methodology using a thermal resistance network for the simulation of grooved heat pipes. However, in their algorithm, there were two nested loops for the convergence of nodal temperatures in the thermal resistance network as well as the vapor temperature. Within the main iterative scheme, an inner loop is used, in which the evaporating and condensing masses are calculated as a function of the vapor temperature to be used in the iterative solution of the energy equation. Their solution algorithm, therefore, also needs an outer loop for the convergence of solid temperatures resulting in longer computation time. In addition, the simulation of a heat pipe with the occurrence of dryout in the evaporator section and/or pool formation in the condenser section was not reported in [11]. Moreover, the capability of the solution algorithm for the grooved heat pipes with varying cross-sectional area in the axial direction was not demonstrated.

In addition, in a study by Vafai and Wang [17] in 1998, a method was developed for the simulation of heat pipes with porous wicks using a thermal resistance network and a pattern for the variation of fluid velocity along the heat pipe. Since the variation pattern of fluid velocity is directly related to the axial variation of mass flow rate of the working fluid, this method is similar to the methodology proposed in this patent application. However, in their method, it is assumed that all the heat is transferred via phase change by negating the axial heat conduction. Since this assumption is not applicable to all operating conditions of all heat pipes, the method proposed by Vafai and Wang [17] is far from being a common analysis tool.

Consequently, it was deemed necessary to make an improvement in the relevant technical field due to the hurdles described above and the inadequacies of the existing solutions to the subject.

SUMMARY

The invention aims to provide a novel methodology with different technical features from the embodiments in the present state of the art.

The main object of the invention is the fast computation of the thermal performance parameters (temperature difference between the two ends of the heat pipe, the phase changing mass along the heat pipe and the thermal load carried by the conduction path, the change of the radius of curvature of the liquid-vapor interface in the axial direction) of the heat pipes by initially assuming patterns for the variation of wall temperature as well as the amount of phase changing mass along the heat pipe. Besides being as fast as simplified 1D models, the invention also computes parameters that can be obtained only with comprehensive 2D and 3D models such as evaporator performance, condenser performance, temperature distribution along the heat pipe, vapor temperature, etc.

Another object of the invention is to predict the formation of the dryout in the evaporator section, determining the starting point of dryout and performing the performance analysis in the presence of a dryout region.

Another object of the invention is to detect the formation of a liquid pool due to the accumulation of liquid in the condenser section, and if present perform the performance analysis in the presence of a liquid pool region.

Another object of the invention is to design a heat pipe by synthesizing the results for the thermal performance values with different input parameters.

To achieve the abovementioned objects, the invention relates to performance determination and design methodology with fast computational speed by simulating the flow and energy transfer within the heat pipe, wherein it comprises the following steps:

Calculation of the pressure variation ($P_{liq}$) along the heat pipe and corresponding edge angle variation ($\theta_{edge}$) to obtain the liquid and vapor phases distribution in the heat pipe wick structure;

Determining the length ($L^{eff}$) of the effective liquid flow region, which extends between the initial point in the evaporator section, where the effective liquid flow occurs, and the point in the condenser section, where the edge angle first reaches 90°

Calculation of the amount of heat transferred by conduction ($Q_{cond}$) and phase change ($Q_{pc}$), using the conduction thermal resistance ($R_{cond}$) and the thermal resistances in the evaporator section ($R_e$) and condenser section ($R_c$) during phase change, Obtaining the operating and performance parameters of the heat pipe such as the temperature distribution along the heat pipe, the axial variation of the radius of curvature of the liquid-vapor interface along the heat pipe, the vapor temperature, and pressure of the fluid.

A detailed explanation given below with references to the figures in the text will accentuate the structure and characteristic features as well as the advantages of the invention; therefore, the evaluation should be made by taking these figures and accompanying detailed explanation into consideration.

DESCRIPTION OF THE ABBREVIATIONS $Q_{tot}$: Total heat transferred in the heat pipe
$Q_{pc}$: Heat transferred in the heat pipe via phase change
$Q_{cond}$: Heat conducted in the axial direction in the heat pipe
$T_e$: Evaporator temperature of the heat pipe
$T_c$: Condenser temperature of the heat pipe
$T_v$: Vapor temperature of the working fluid
$P_{liq}$: Variation of the liquid pressure of the working fluid
$\theta_{edge}$: Variation of the edge angle
$L^{eff}$: Effective length of the heat pipe
$R_e$: Thermal resistance in the evaporator section
$R_c$: Thermal resistance in the condenser section
$R_{cond}$: Thermal resistance of the axial heat conduction

DETAILED DESCRIPTION OF THE EMBODIMENTS

In this detailed description, the preferred embodiments of the invention are merely described for a better understanding of the subject matter and without introducing any limitations.

The invention relates to the thermal performance determination and heat pipe design methodology with fast solution speed for heat pipes.

Heat pipes are structures that contain a pure operating fluid (water, ammonia, etc.) in two phases (liquid-gas) and are made of a material with high thermal conductivity (copper, aluminum, etc.), arbitrary geometric cross-section. Walls are kept as thin as possible to minimize heat pipe size and weight. Inner sides of the thin walls are coated with wick structures that allow the transportation of the liquid phase of the operating fluid. The gas phase of the operating fluid is transported in the inner space surrounded by the wall and the wick structure integrated into the wall. The energy (heat) transport in the heat pipe is basically performed via convection energy transfer through a continuous flow of the liquid and gas phases (vapor) of the operating fluid in opposite directions. The driving force required for fluid flow is achieved by capillary pumping. Hence, heat pipes do not need an extra drive system (pump, fan, etc.) for fluid motion. Conversion between liquid and vapor is provided by evaporation and condensation occurring at opposite ends of the heat pipe.

One end of the heat pipe is kept in contact with the heat source (a high heat flux electronic component, etc.) that is intended to be cooled. This contacting external surface can be named as the heating surface. Energy transmitted through heat pipe from the heating surface evaporates the liquid in the wick in this zone. The section of the heat pipe where evaporation is effective is called the evaporator. The evaporated fluid in the evaporator section moves to the opposite end of the heat pipe. Heat transmitted to the opposite end is discharged to the external environment by a suitable cooling system (liquid cooling, air cooling, etc.) from the outer surface of the heat pipe. This contacted external surface can be named as the cooling surface. The energy removed from the cooling surface condenses the vapor on the wick inside the heat pipe. The part of the heat pipe where condensation is effective is called the condenser. With the aforementioned mechanism, the energy removed from the heat source is discharged to the outside via the gas phase (vapor) of the fluid in the heat pipe. Rupture and formation of physical bonds between fluid molecules during phase change occur at almost constant temperature; thereby, heat transfer based on phase change allows high heat loads to be transferred with very small temperature difference. Therefore, heat pipes provide an absolute benefit in the thermal management of local high flux heat sources.

Continuity of the fluid cycle requires the transport of the liquid formed in the condenser to the evaporator uninterruptedly. Capillary paths in the wick structure provide this transport by capillary pumping. Capillary pumping originates from the Laplace pressure variation due to the change of the curvature of the liquid-vapor interface between the liquid in the capillary paths and the vapor above it along the main axis of the heat pipe. Changes in interface curvature are subject to certain limitations due to geometry, solid and liquid material properties, etc. Therefore, capillary pumping is also limited. Heat pipes may encounter dryout in the evaporator section and/or pooling in the condenser section when the amount of phase change exceeds the capillary pumping capacity. Dryout is an undesirable incidence and should be avoided as it may cause sudden temperature increases on the heat source that is to be cooled. The existence of pooling, on the other hand, should be regarded as a condition that may need to be detected and, if necessary, limited or eliminated by applying geometric modifications on the heat pipe, as it affects the overall performance of the heat pipe by affecting the condenser performance.

A significant amount of heat transfer over the heat pipe is via fluids (i.e. based on phase change); however, heat transfer is always accompanied by heat conduction in the solid and a small portion in the liquid. The high ratio of phase change heat transfer to conduction-based heat transfer is an important indicator of the efficient operation of the heat pipe. When this happens, the temperature difference between the two ends of the heat pipe also attains a minimum.

Based on the above-mentioned explanations, two basic models are required to simulate the operation of the heat pipe:
    i. Fluid flow model
    ii. Heat transfer model
    i. Fluid Flow Model Determination of the required pressure distribution for the fluid flow is the most critical step of heat pipe modeling. Variation of the liquid-vapor interface along the heat pipe must be known to detect the fluid pressure. The shape of this interface is both a direct input to start the solution of the problem and also an output to be found as a result of the solution to the flow and energy transfer problems; therefore, the flow and energy equations are coupled. For this reason, it is necessary to use an iterative algorithm in the solution of the problem. Furthermore, the solution domain must be divided into a finite number of elements to capture the variation of the fluid pressure along the heat pipe during the solution. A computational model that divides the domain into a finite number of elements and includes an iterative solution at the same time contains significant numerical challenges. For example; with existing CFD (Computational Fluid Dynamics) programs, it is possible to solve a heat-fluid problem that is divided into a finite number of zones and has an invariant solution domain. However, performing this solution iteratively and updating the solution domain in each iterative step may exceed the capabilities of existing CFD programs due to the changing liquid-vapor interface. It is relatively easier to reach a numerical solution when one-dimensional simplified models [1-4] are used, which do not include iterative solutions and only consider the fluid flow in the adiabatic section without modeling the flow of fluid in the evaporator and condenser sections. However, these models cannot detect pool formation in the condenser and therefore cannot find a reliable temperature distribution.

In the method according to the invention, at the beginning of the iterative solution, an initial pattern is assumed for the variation of the amount of phase changing mass along the heat pipe instead of dividing the solution zone into a finite number of elements or solving the entire flow problem in two- or three-dimensions or simplifying the problem and neglecting the liquid flow in the evaporator and condenser parts, etc.; and fluid pressures are calculated in accordance with this assumption. A key benefit of this method is that, unlike the methodologies in the prior art, which employ nested algorithms for the shape of the liquid-vapor interface, the pressure distribution in the axial direction, the conservation of mass and momentum in the liquid, and the convergence of the energy balance in the liquid and solid; the computation speed substantially increases with the elimination of the necessity of using thin film phase change models in the calculation of evaporating and condensing mass because of the inclusion of thin film phase change models only in the thermal resistance calculations due to the fact that the sole convergence criterion is based on the convergence of the pattern of the variation of the amount of phase changing mass of the solution cycle.

For the detailed analysis of the aforementioned fluid flow model, the first step after assuming the variation of mass flow rate is to find the mathematical relation between the flow (mass) amount in the axial direction and the pressure change. This correlation can be determined analytically with the Poisseuille flow hypothesis in a grooved geometry, or by means of (experimental/analytical/numerical) correlations specific to the wick structure [3]. In the second step, the pressure variation pattern is obtained by an integration operation along the axial direction of the heat pipe. This approach enables the determination of pressure variation along the heat pipe without dividing the heat pipe into finite elements, but only by means of three main sections (evaporator, condenser, and adiabatic section). Nevertheless, the presented algorithm does not limit the modeling to three main sections; these sections can be divided into multiple sub-sections within themselves and the amount of phase change mass (and temperature) pattern can be defined separately for each sub-section. Therefore, the sections where the heat pipe wick structure changes along the heat pipe (section zone/geometry change, capillary size change, hierarchical topography change, etc.), if any, can also be incorporated in the solution algorithm.

At a particular iterative step of this iterative method, the variation of the mass flux in the axial direction is an input, and it determines the shape of the liquid-vapor interface formed along the entire heat pipe. In order to evaluate the accuracy of the input mass, it is necessary to determine the partition of the total energy transfer between phase change and conduction heat transfer in the axial direction. The amount of transported mass is a direct indicator of heat transfer by phase change. It is necessary to determine the thermal resistance network of the heat pipe to determine the contribution of heat conduction and phase change to the total energy transfer.

ii. Heat Transfer Model

The heat transferred to the heat pipe through the heater follows two primary paths. While some of the heat enables the liquid in the evaporator section to evaporate, the remainder is transferred to the condenser section of the heat pipe by axial heat conduction in the solid and liquid. The total heat flow is distributed in such a way that it will be inversely proportional to the thermal resistances on these paths. Therefore, the thermal resistances on the paths transferring the heat should be determined. Thermal resistances depend on the geometry of the heat pipe and wick, as well as the material properties of the medium transferring the heat. The shape of the liquid-vapor interface changes along the heat pipe axis; therefore, 3D modeling strategies also divide the heat pipe into many finite elements during thermal modeling. Furthermore, most modeling strategies, including one-dimensional models, divide the heat pipe into a finite number of elements to obtain the wall temperature variation along the heat pipe.

Figure 1:
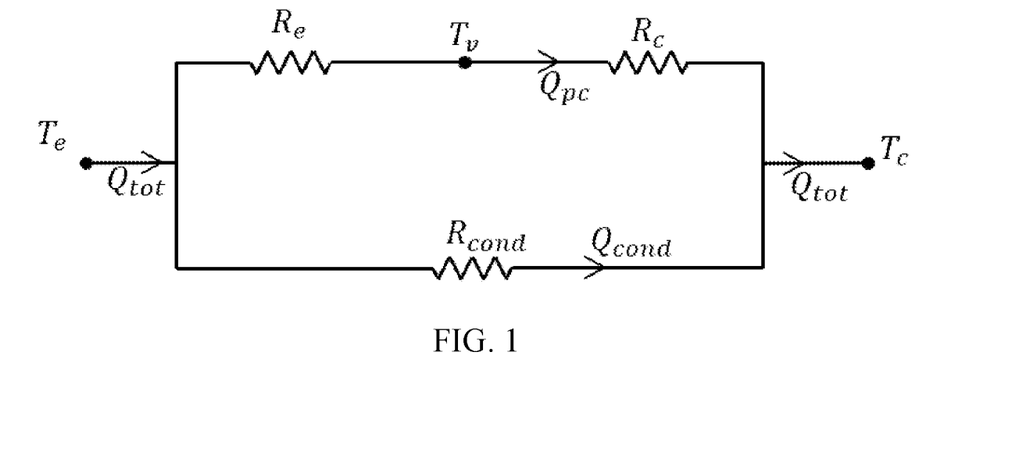
FIG. 1 is the thermal resistance network employed in the heat transfer modeling for three main sections (evaporator, condenser, and adiabatic section).

On the other hand, in the case of the method according to the invention, the temperature distribution is calculated by solving the thermal resistance network. Thus, the heat transfer model is simplified substantially, without compromising the underlying physics of the problem. The thermal resistance network used in the heat transfer model is shown in FIG. 1. The heat transferred via phase change is transferred through evaporation ($R_e$) and condensation ($R_c$) resistances while energy transferred via heat conduction in the axial direction flows over the wall resistance ($R_{cond}$) of the heat pipe.

The Method According to the Invention

Figure 2:
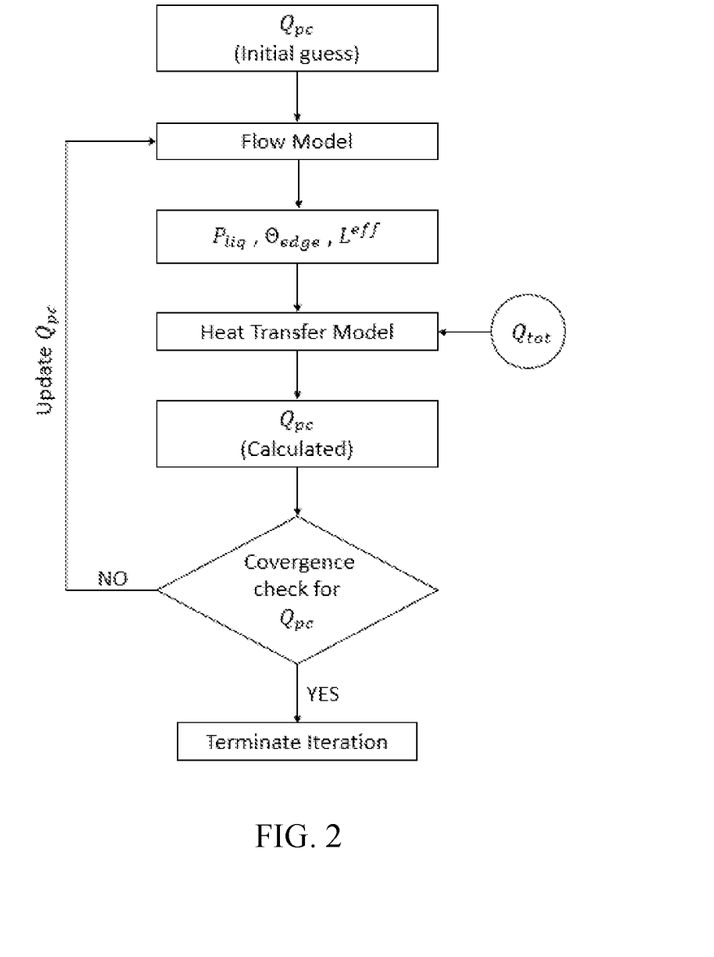
FIG. 2 is the flowchart of the method of the invention.

The solution method presented in the flow diagram in FIG. 2 is formed via combining the liquid flow and heat transfer models, which are the sub-components of the method according to the invention. The solver resolves the fluid flow and heat transfer coupled in the heat pipe, revealing the heat pipe performance (pressure and temperature distribution in the axial direction, amount of heat transferred via phase change, vapor temperature and pressure, whether a pool region is formed in the condenser, whether there is dryout in the evaporator, etc.) for heat pipe's geometrical details, material information, details about the cooling system where the heat is dissipated (cooling fluid temperature, heat transfer coefficient, etc.), and the amount of heat to be transported from the heat source. The process steps regarding the subject of the invention are as follows:

In the first step, the wick structure (porous/grooved), geometry and material properties of the heat pipe (including the porosity and permeability coefficients of the wick structure of the porous heat pipe structure) are defined.

An estimate of the amount of phase-changing mass variation along the heat pipe is provided as an input.

The pressure variation ($P_{liq}$) along the axis of the heat pipe is calculated. The edge angle ($\theta_{edge}$) distribution corresponding to the pressures is found via the Young-Laplace equation. The length of the effective liquid flow region ($L^{eff}$), which is the distance between the location where the phase change is first encountered in the evaporator and the point where the edge angle first reaches 90° in the condenser, is computed based on the edge angle distribution.

In the context of the heat transfer mode, of the total heat transported ($Q_{tot}$) the distribution of the amount transported via conduction ($Q_{cond}$) and the amount transferred via phase change ($Q_{pc}$) is calculated. The calculations are based on the conduction thermal resistances ($R_{cond}$) and the phase change thermal resistances in the evaporator ($R_e$) and condenser zones ($R_c$) encountered along the path of heat flow. Thermal resistance calculations are performed with the following formulas, regardless of the cross-sectional zone:

$$R'' = \frac{L}{k}$$

(Thermal resistance of the heat conduction is determined based on Fourier's law of conduction.)

L indicates the distance traveled by the heat, and k indicates the heat transfer coefficient of the material.

The theory proposed by Sujanani and Wayner [18] was used for the resistance to the phase change that develops at the liquid-vapor interface during the phase change:

$$R''=\Delta T/(a\Delta T+b\Delta P)h_{fg}$$

$h_{fg}$ is the latent heat of vaporization. a and b are constants that are functions of phase temperatures, vapor pressure, and several material properties, while $\Delta T$ and $\Delta P$ are interfacial temperature and pressure jumps, respectively.

If the amount of heat carried by phase change ($Q_{pc}$) calculated by the heat transfer model does not converge, the calculation is repeated by using the newly calculated values as input. Heat transfer model is also continuously updated to match the vapor temperature with the thermal resistance network of the heat pipe during the iterations. The iterative solution is concluded after the convergence of the values for the amount of heat carried by the phase change.

Verification of the Method According to the Invention

For the verification of the invented method, comparisons were performed with the results of the existing experimental studies in the literature. For the comparisons, the same properties of the heat pipe used in the experimental study (wick structure, material properties, geometric properties of internal and external structure, etc.) and operating conditions (total thermal load on the heat pipe, condenser cooling conditions, etc.) are provided as the input to the method (algorithm) according to the invention. Upon these inputs, the performance parameters computed by the algorithm (the wall temperature, the axial variation of radius of curvature of the liquid-vapor interface along the heat pipe, etc.) were compared with the values measured during the experiment.

The results were first compared to those of Lefèvre et al. [11] for flat grooved heat pipes. In this study [11], the results of the comprehensive numerical model developed by the authors, which divided the solution domain into finite parts for both fluid flow and heat transfer, as well as the results of the experimental measurements were presented. Therefore, a comparison was made with both the experimental and numerical results of Lefèvre et al. [11].

Figure 3:
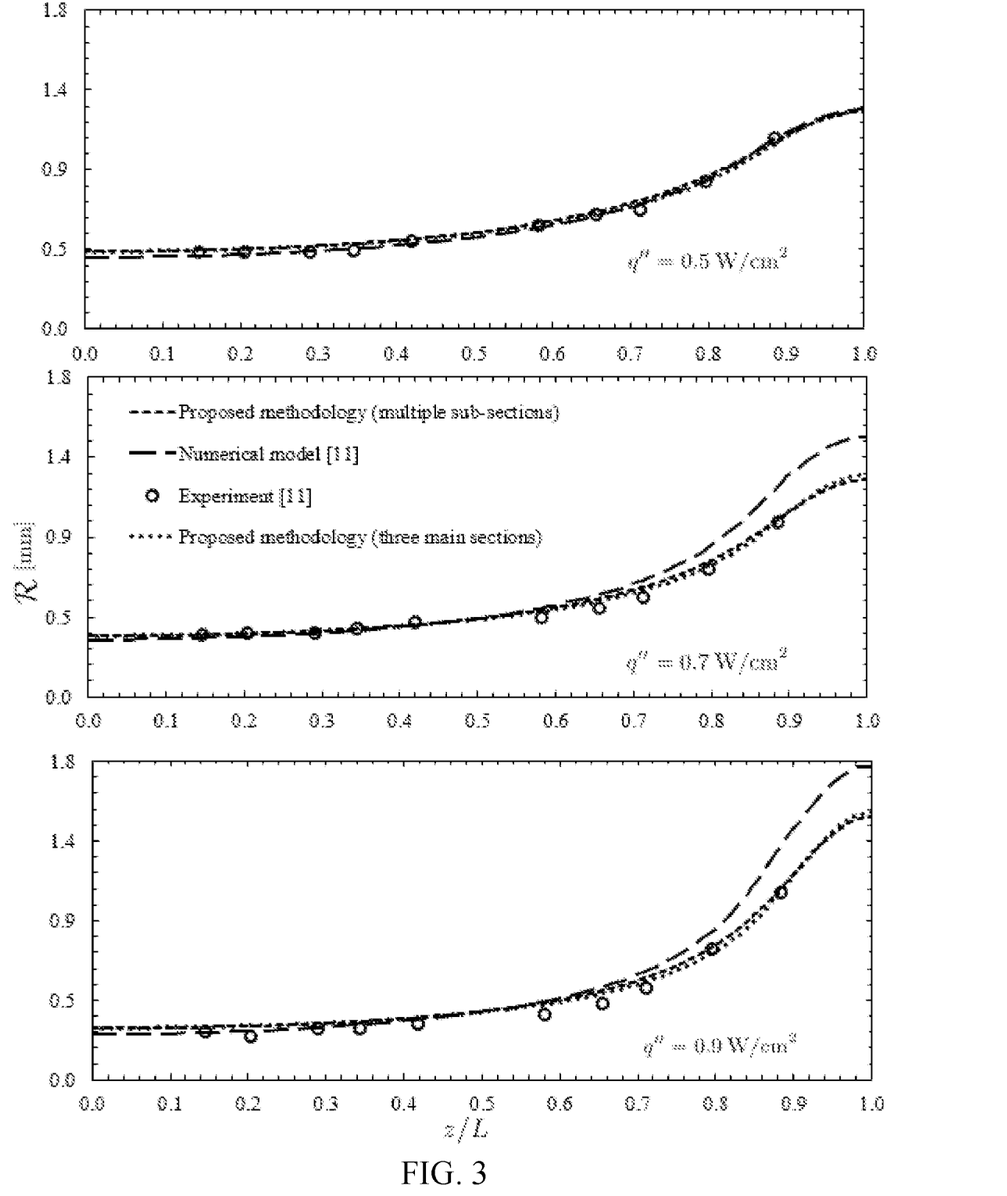
FIG. 3 is the comparison of the predictions of the radius of curvature variation on the liquid-vapor interface by the method of the invention with experimental results and the results of a comprehensive numerical model for three different heat inputs.

In FIG. 3, the experimental and numerical results of Lefèvre et al. [11] for heat flux values of 0.5, 0.7, and 0.9 W/cm$^2$ together with the results of the algorithm according to the invention are shown. As can be seen in FIG. 3, the variation of the radius of curvature of the liquid-vapor interface is determined by the method of the invention along the heat pipe and the experimental results of the study of Lefèvre et al. [11] match very well, whereas the numerical modeling results of the study of Lefèvre et al. [11] overestimates the radius of curvature values for heat flux values of 0.7 and 0.9 W/cm$^2$.

Figure 4:
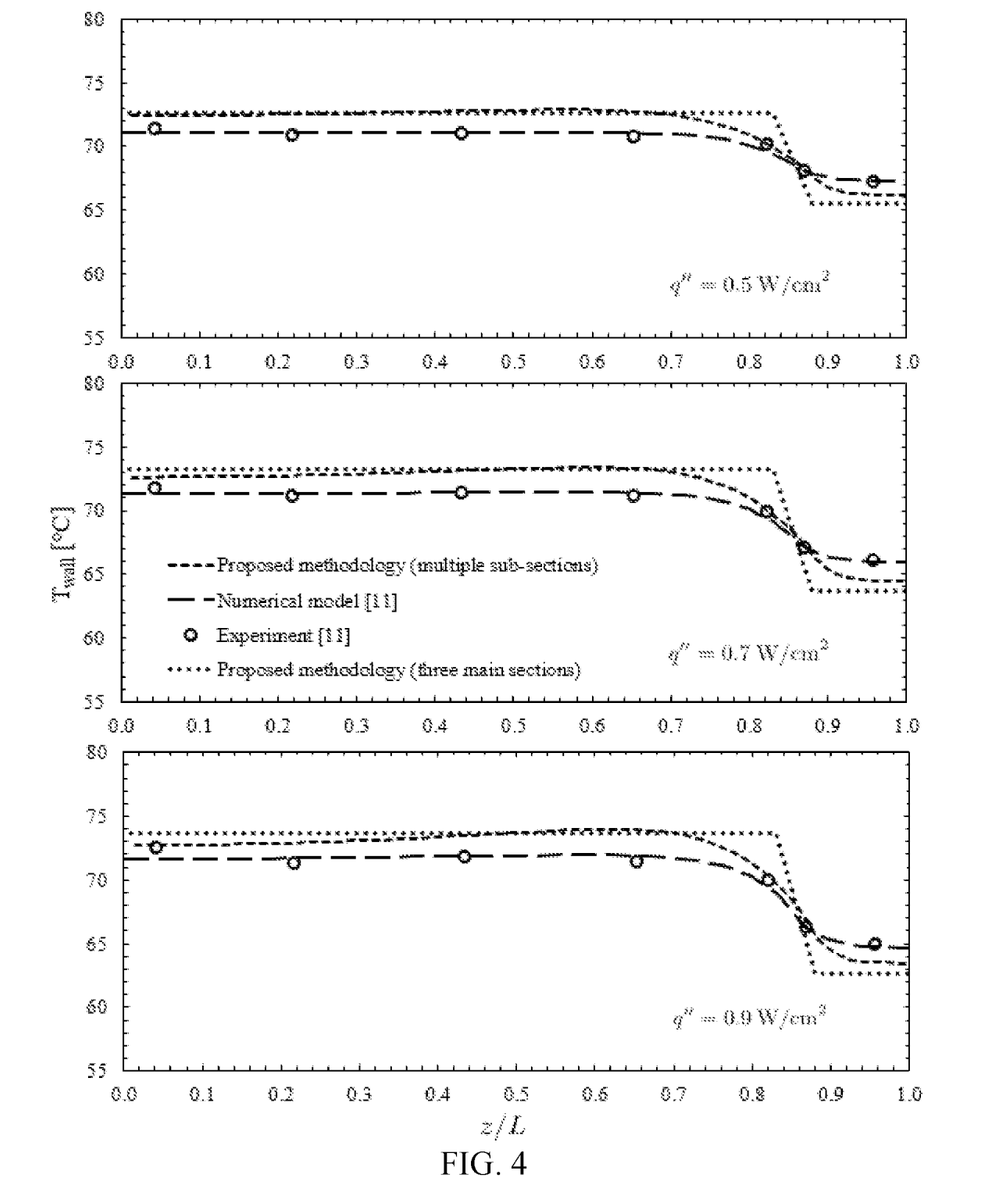
FIG. 4 is the comparison of the predictions of temperature distribution by the method of the invention with experimental results and the results of a comprehensive numerical model for three different heat inputs.

In FIG. 4, the variation of the wall temperature along the heat pipe is compared at the same heat loads. The results obtained using the method according to the invention show that the variation of the wall temperature agrees fairly well with the experimental results of Lefèvre et al. [11]. There is a perfect match between the numerical estimation of the method according to the invention and experimental results in the adiabatic region (i.e. the transition region between the evaporator and condenser sections) for all heat loads despite the slight overestimation in the evaporator section and underestimation in the condenser section. The computation time of the numerical model by Lefèvre et al. [11], which used two nested loops to approximate the nodal temperatures and especially the vapor temperature in the thermal resistance network, is expected to be much longer than the computation time of the algorithm according to the invention (<1 second), which employs a single iterative cycle for convergence.

An important feature of the method according to the invention is that it can also model the heat pipes with varying liquid flow area along the heat pipe. In a study by Lefèvre et al. [19] in 2010, experimental measurements were taken on a grooved heat pipe, in which the cross-sectional area of the grooves was increasing from the evaporator section to the condenser section. The numerical model developed by the same authors in their previous study [11] was not used for verification purposes in their study in 2010 [19]. The reason for this may be due to the fact that the numerical model they developed could not obtain a solution for varying liquid flow area. The method according to the invention is able to simulate the experiments conducted in the study of Lefèvre et al. [11] owing to its capability.

Figure 5:
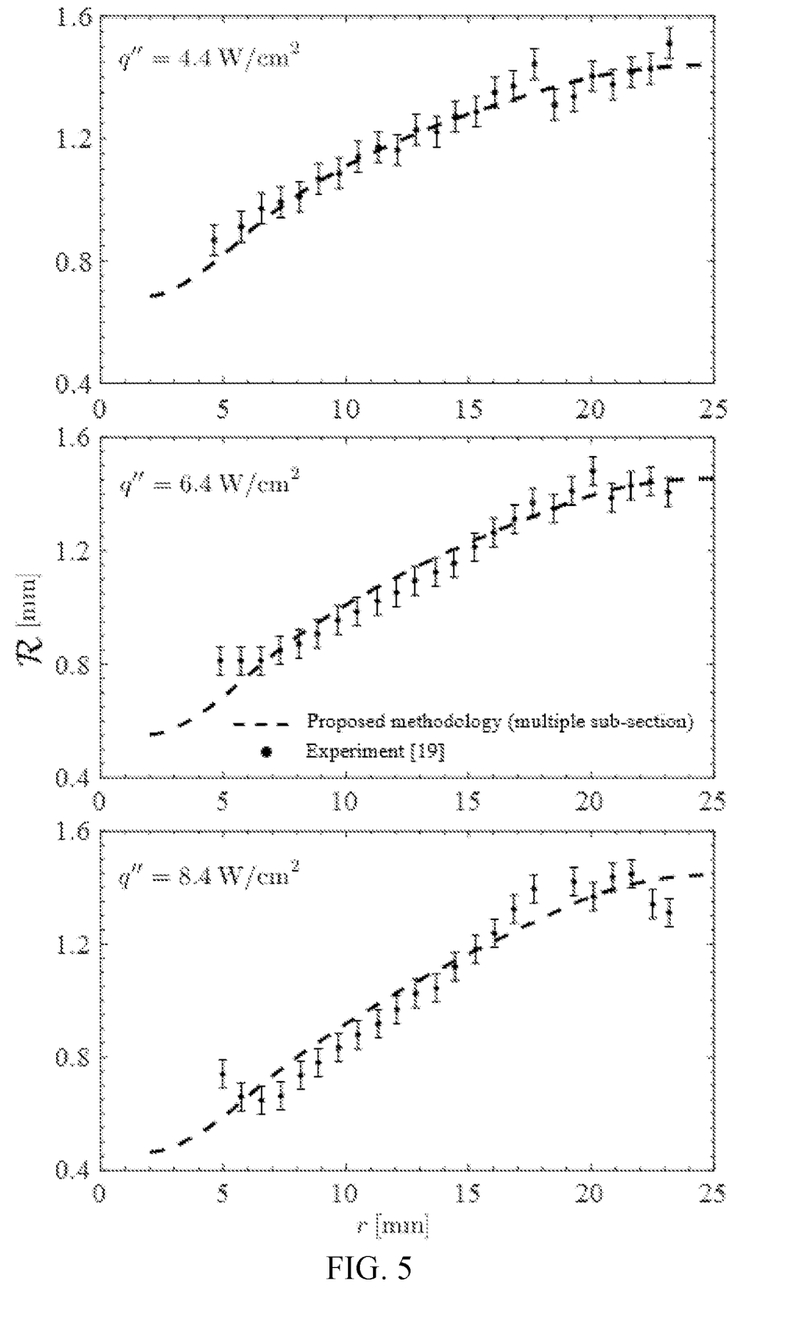
FIG. 5 is the comparison of the predictions of the radius of curvature variation on the liquid-vapor interface for a varying liquid flow area along the heat pipe by the method of the invention with experimental results for three different heat inputs.

In FIG. 5, the experimental results of Lefèvre et al. [19] at a heat flux values of 4.4, 6.4, and 8.4 W/cm$^2$ and the results of the algorithm according to the invention are presented. As seen in FIG. 5, the variation of the radius of curvature of the liquid-vapor interface along the heat pipe obtained by the method of the invention and the experimental results of Lefèvre et al. [19] agree well.

Verifications revealed that the method according to the invention can successfully simulate flat grooved heat pipes both with constant and varying liquid flow areas. It was also observed that the method according to the invention achieves the results of the comprehensive models with a similar success but with a much faster computational speed. Therefore, the modeling of a heat pipe that already requires complex modeling on its own is achieved with high computational speed and high accuracy.

REFERENCES

1. Zohuri, B. "Heat pipe design and technology: modern applications for practical thermal management", Springer, 2016.
2. Reay, D., McGlen, R. and Kew, P., "Heat pipes: theory, design and applications", Butterworth-Heinemann, 2013.
3. Faghri, A., "Heat pipe science and technology", Global Digital Press, 1995.
4. Peterson, G. P., "An introduction to heat pipes: modeling, testing, and applications", aith, 1994.
5. Faghri, A., "Heat pipes: review, opportunities and challenges", *Frontiers in Heat Pipes (FHP)*, 5(1).
6. Alijani, H., Cetin, B., Akkus, Y. and Dursunkaya, Z., "3-D modeling of a flat grooved heat pipe", 10$^{th}$ *International Conference on Computational Heat, Mass and Momentum Transfer*, Seul, 2017.
7. Khrustalev, D. and Faghri, A., "Thermal characteristics of conventional and at miniature axially grooved heat pipes", *ASME J Heat Transf,* 117:10481054, 1995.
8. Hopkins, R., Faghri, A. and D. Khrustalev, "Flat miniature heat pipes with micro capillary grooves", *ASME J Heat Transf,* 121:102-109, 1999.
9. Kim, S. J., Seo, J. K. and Do, K. H., "Analytical and experimental investigation on the operational characteristics and the thermal optimization of a miniature heat pipe with a grooved wick structure", *Int J Heat Mass Tran,* 46:2051-2063, 2003.
10. Do, K. H., Kim, S. J. and Garimella, S. V., "A mathematical model for analyzing the thermal characteristics of a flat micro heat pipe with a grooved wick", *Int J Heat Mass Tran,* 51:4637-4650, 2008.
11. Lefèvre, F., Rulliere, R., Pandraud, G. and Lallemand, M., "Prediction of the temperature field in flat plate heat pipes with micro-grooves: experimental validation", *Int J Heat Mass Tran,* 51:4083-4094, 2008.
12. Xiao, B. and Faghri, A., "A three-dimensional thermal-fluid analysis of flat heat pipes", *Int J Heat Mass Tran,* 51:3113-3126, 2008.
13. Tournier, J. M. and El-Genk, M. S., "A heat pipe transient analysis model", *Int J Heat Mass Tran,* 37:753-762, 1994.
14. Odabasi, G., "Modeling of multidimensional heat transfer in a rectangular grooved heat pipe", Ph.D. Thesis, Middle East Technical University, 2014.
15. Kurt, C., "Three-dimensional modeling of heat transfer and fluid flow in a flat-grooved heat pipe", M. S. Thesis, İ. D. Bilkent University, 2019.
16. Gokay, G., "Development of a CFD assisted 3-D modelling and analysis methodology for grooved heat pipe design and performance assessment", Ph.D. Thesis, Middle East Technical University, 2020.
17. Vafai, K. and Wang, W., "Analysis of flow and heat transfer characteristics of an asymmetrical flat plate heat pipe", *Int J Heat Mass Tran,* 35:2087-2099, 1992.

18. Sujanani, M. and Wayner, P. C., "Microcomputer-enhanced optical investigation of transport processes with phase change in near-equilibrium thin liquid films", J Coll Interf Sci, 2:472-488, 1991.
19. Lefèvre, F., Rullière, R., Lips, S. and Bonjour, J., "Confocal microscopy for capillary film measurements in a flat plate heat pipe", *ASME J Heat Transf,* 132:031502, 2010.

What is claimed is:

1. A fast performance determination and design methodology simulating a flow and an energy transfer inside a heat pipe, comprising the following steps:
   i. calculating a pressure variation ($P_{liq}$) along the heat pipe and a corresponding edge angle variation ($\theta_{edge}$) to obtain a liquid and vapor phases distribution in a heat pipe wick structure;
   ii. determining a length of an effective liquid flow region ($L^{eff}$), which extends between an initial point in an evaporator section, where the effective liquid flow occurs, and a point in a condenser section, where an edge angle first reaches 90°;
   iii. calculating an amount of heat transferred by a conduction ($Q_{cond}$) and a phase change ($Q_{pc}$), using a conduction thermal resistance ($R_{cond}$) and thermal resistances in the evaporator section ($R_e$) and the condenser section ($R_c$) during the phase change; and
   iv. obtaining operating and performance parameters of the heat pipe including at least one of a temperature distribution along the heat pipe, a variation of a radius of curvature of a liquid-vapor interface along the heat pipe, a vapor temperature, or pressure of a fluid.

2. The performance determination and design methodology according to claim 1, wherein performance parameters for designs with varying cross-sectional area/geometry and/or capillary size and/or hierarchical topography and/or porosity and permeability for heat pipes with a porous wick structure along the heat pipe are obtained.

3. The performance determination and design methodology according to claim 1, comprising a step of determining the initial point of a dryout and conducting a performance analysis in a presence of a dryout region, if any, in the evaporator section.

4. The performance determination and design methodology according to claim 1, comprising a step of determining a formation of a liquid pool due to an accumulation of a liquid in the condenser section and performing an analysis in a presence of a liquid pool, if any.

* * * * *